US008973729B2

(12) United States Patent
Raber (10) Patent No.: US 8,973,729 B2
(45) Date of Patent: Mar. 10, 2015

(54) COUPLING DEVICE

(71) Applicant: Schaeffler Technologies GmbH & Co. KG, Herzogenaurach (DE)

(72) Inventor: Christoph Raber, Ottweiler-Steinbach (DE)

(73) Assignee: Schaeffler Technologies GmbH & Co. KG, Herzogenaurach (DE)

( * ) Notice: Subject to any disclaimer, the term of this patent is extended or adjusted under 35 U.S.C. 154(b) by 0 days.

(21) Appl. No.: 14/186,295

(22) Filed: Feb. 21, 2014

(65) Prior Publication Data

US 2014/0166424 A1 Jun. 19, 2014

Related U.S. Application Data

(63) Continuation of application No. PCT/DE2012/000796, filed on Aug. 7, 2012.

(30) Foreign Application Priority Data

Aug. 24, 2011 (DE) .......................... 10 2011 081 476
Dec. 5, 2011 (DE) .......................... 10 2011 087 733

(51) Int. Cl.
*F16D 13/75* (2006.01)
*F16D 13/38* (2006.01)

(52) U.S. Cl.
CPC .............. *F16D 13/38* (2013.01); *F16D 13/757* (2013.01)
USPC ................................................... 192/111.2

(58) Field of Classification Search
USPC ................... 192/111.2, 111.3, 111.5, 111.18, 192/111.17, 70.252
See application file for complete search history.

(56) References Cited

U.S. PATENT DOCUMENTS

| 4,228,883 | A | | 10/1980 | Palmer | |
|---|---|---|---|---|---|
| 5,251,737 | A | * | 10/1993 | Flotow et al. | 192/111.17 |
| 5,816,379 | A | * | 10/1998 | De Briel et al. | 192/70.252 |
| 5,971,125 | A | * | 10/1999 | Doremus et al. | 192/70.252 |
| 6,161,670 | A | * | 12/2000 | Doremus et al. | 192/70.252 |
| 6,176,360 | B1 | * | 1/2001 | Thirion de Briel et al. | 192/70.252 |
| 6,296,098 | B1 | * | 10/2001 | Graton et al. | 192/70.252 |
| 6,354,419 | B1 | * | 3/2002 | Dalbiez et al. | 192/70.252 |
| 6,957,729 | B2 | * | 10/2005 | Osman et al. | 192/70.252 |
| 8,733,525 | B2 | * | 5/2014 | Raber et al. | 192/70.252 |

FOREIGN PATENT DOCUMENTS

| DE | 102005058844 | 7/2006 |
|---|---|---|
| DE | 102008051100 | 5/2009 |

* cited by examiner

*Primary Examiner* — Saul Rodriguez
*Assistant Examiner* — David J Hlavka
(74) *Attorney, Agent, or Firm* — Volpe & Koenig, P.C.

(57) ABSTRACT

A coupling device including at least one torque transmitting device, which can be engaged and/or disengaged in the axial direction by a lever element and which is frictionally engaged in the engaged state, and including at least one wear compensation device, which has at least one rotatable ramp ring that can be clamped by the lever element at least temporarily and which has at least one rotatably mounted spindle drive with a spindle shaft, the spindle drive acting on the ramp ring. The wear compensation device has at least two continuously variable free running units which act in different rotational directions, a first free running unit being designed to rotate the spindle shaft when a wear state of the torque transmitting device is sensed and a second free running unit being designed to prevent a reverse rotation of the spindle shaft.

10 Claims, 4 Drawing Sheets

COUPLING DEVICE

INCORPORATION BY REFERENCE

The following documents are incorporated herein by reference as if fully set forth: International Application No. PCT/DE2012/000796, filed Aug. 7, 2012; German Patent Application No. DE 102011081476.0, filed Aug. 24, 2011; and German Patent Application No. DE 102011087733.9, Dec. 5, 2011.

BACKGROUND

The present invention relates to a coupling device having at least one torque transmitting device, which can be engaged and/or disengaged in the axial direction by a lever element and which is frictionally engaged in the engaged state.

A coupling device of this type is known from DE 10 2008 051 100 A1. The coupling device comprises a torque transmitting device, which is frictionally engaged in the engaged state and which can be engaged and disengaged by a lever element, and a wear compensation device. The wear compensation device comprises a rotational ramp ring, which can be clamped by the lever element, as well as a spindle drive comprising a spring shaft, supported in a rotational fashion, and acting upon the ramp ring.

By the wear compensation device the operating point of the coupling device, which changes due to the wear and tear of the friction coatings, can be automatically readjusted. Here the ramp ring is rotated by the spindle drive when wear of the coupling has been sensed, and for this purpose a link is fastened at the housing of the coupling device. The link, fixed at the housing, engages a sprocket of the spindle drive in a form-fitting fashion in order to sense the status of wear, when the torque transmitting device is being engaged, by skipping a tooth of the sprocket, and in order to drive said sprocket when the torque transmitting device is being disengaged, causing the ramp ring to be rotated. Based on the division of the tooth structure of the sprocket the above-mentioned sensing of wear and tear and the readjustment of the sensed wear of the coupling is only possible in a discontinuous and gradual fashion.

SUMMARY

The objective of the present invention is to provide a coupling device, in which a changed operating point can easily be corrected as precisely as possible, and in which simultaneously the functional safety can be increased.

This objective is attained in a coupling device with one or more features according to the invention with at least one torque transmitting device, which is frictionally engaged in the engaged state, and which can be engaged and/or disengaged in the axial direction by a lever element, and at least one wear compensation device, which comprises at least one rotational ramp ring, which at least temporarily can be clamped by the lever element, and at least one rotationally supported spindle drive with a spindle shaft, acting upon the ramp ring. Due to the fact that the wear compensation device comprises at least two continuous free running units, acting in different directions of rotation, with a first free running unit being embodied to rotate the spindle shaft when a wear condition of the torque transmitting device has been sensed, and with a second free running unit being embodied to prevent any reverse rotation of the spindle shaft, on the one hand a changed operating point of the coupling device can be easily corrected in a most precise fashion, while on the other hand increased functional safety is given due to the free running units acting in different directions of rotation. In particular, the second free running unit serves as a safety against reverse rotation, so that the blocking of the spindle drive no longer depends on the preload and the friction of the ramp ring at the operating point of the coupling device and/or the torque transmitting device.

Preferred exemplary embodiments of the present invention are explained below and in the claims.

The coupling device preferably comprises a housing, in which the torque transmitting device is arranged. The torque transmitting device preferably comprises at least one counter pressure plate, fixed in a torque-proof fashion at the housing, at least one compression plate, supported torque-proof in reference to the housing and displaceable to a limited extent in the axial direction of the coupling device with regards to the counter pressure plate, and at least one coupling disk with at least one friction coating, which can be frictionally clamped between the compression plate and the counter pressure plate for transmitting torque. Preferably the two continuous free running units are embodied such that they transmit torque, depending on the direction of rotation, in a force-fitting, preferably frictionally engaged fashion to a common spindle shaft or to different spindle shafts.

In particular, here it is advantageous under cost and space aspects when the blocking moment of the second free running unit is lower than the blocking moment of the first free running unit, because the second free running unit must only support the free running moment of the spindle drive and/or the first free running unit.

When the coupling disk in the engaged state of the coupling device and/or the torque transmitting device is clamped between the compression plate and the counter pressure plate, here a friction-fitting transmission of the torque occurs from the input side of the coupling device, via the compression plate and the counter pressure plate, to the coupling disk and/or its friction coatings, and from the coupling disk to the output side of the coupling device, for example to the input shaft of the transmission.

By an actuator acting upon the lever element the coupling device and/or the torque transmitting device can be engaged and/or disengaged. The lever element may represent a disk spring, as commonly used in normally engaged coupling devices, or a lever spring, as commonly used in normally disengaged coupling devices.

When the coupling device is embodied as a normally engaged coupling device the force of the engaging disk spring acting upon the compression plate exceeds the force of disengaging flat springs acting upon the compression plate in the non-activated state. Upon activation, the disk spring is impinged by the actuator with a force, by which the coupling is disengaged. However, the coupling device may also be embodied as a normally disengaged coupling device, i.e. as a coupling in which the force of the disengaging flat springs acting upon the compression plate exceeds the force of the lever spring acting upon the compression plate in the non-activated state. Upon activation the lever spring is impinged by the actuator with a force, by which the coupling is engaged.

The coupling device may also be embodied as a compressed coupling device, i.e. as a coupling device in which the actuator applies a compressing force upon the disk spring and/or the lever spring, or as a stressed coupling device, i.e. as a coupling device in which the actuator applies a tension upon the disk spring and/or the lever spring. Further, on the one side the coupling device may be embodied as a dry coupling and on the other side as a wet coupling. In the latter case, the isolation is advantageous of the free running units, particularly friction-fitting ones, from the wet chamber of the coupling device.

Furthermore, the coupling device may be embodied as a single coupling, i.e. comprising a single torque transmitting device with a compression plate, a counter pressure plate, and a coupling disk, which can be clamped therebetween; however it may also be embodied as a multiple coupling, particularly a dual coupling. In a dual coupling the two torque transmitting devices preferably share a common counter pressure plate, which in this context is also called a central plate.

The wear compensation device preferably represents a path-based wear compensation device. The ramp ring of the wear compensation device is supported in a manner such that it can be clamped in the axial direction between the compression plate and the lever element, particularly at a force edge of the disk spring. At the surface facing away from the lever element, the ramp ring exhibits ramps, which are arranged gliding mobile on counter ramps such that in a relative rotation of the ramp ring, the ramps of the ramp ring glide along the counter ramps, causing the distance to shorten between the compression plate and the surface of the ramp ring facing away from the compression plate, by which the ramp ring engages the lever element. Preferably the counter ramps are embodied in one piece with the compression plate, and particularly recessed in the compression plate.

According to a preferred exemplary embodiment, the first free running unit or the second free running unit comprises a roller clutch. A roller clutch allows a particularly sensitive reaction behavior in order to rotationally drive the spindle shaft when a wear status of the torque transmitting device has been sensed and/or in order to prevent any reverse rotation of the spindle drive opposite the wear compensation.

According to another preferred exemplary embodiment the second free running unit or the first free running unit comprises a wrap spring. For example, the first free running unit may comprise a roller clutch, while the second free running unit comprises a wrap spring. It is also possible that the first free running unit comprises a wrap spring while the second free running unit comprises a roller clutch. The use of a wrap spring is cost effective, and the wrap spring is characterized in a simple design.

In particular, it is advantageous when both free running units have roller clutches acting in different directions of rotation. By the use of identical parts the overall costs for producing the coupling device can be reduced. Alternatively it is advantageous for the two free running units to have wrap springs acting in different directions of rotation. In particular, these wrap springs are wound in different directions.

According to another preferred exemplary embodiment the roller clutch is arranged on the spindle shaft, depending on the position of an operating point of the torque transmitting device changed due to the wear status, in order to engage in a force-fitting, preferably a friction-fitting fashion the spindle shaft to compensate wear by rotating the ramp ring in reference to the complementary counter ramps and/or to prevent the reverse rotation of the spindle shaft.

According to another or an alternative, preferred exemplary embodiment the wrap spring wraps the spindle shaft under internal stress and, depending on the position of the operating point of the torque transmitting device, changed by the status of wear, is embodied to engage in a force-fitting, preferably friction-fitting fashion the spindle shaft in order to compensate wear by rotating the ramp ring in reference to complementary counter ramps and/or in order to prevent the reverse rotation of the spindle shaft.

Preferably, spring ends of the wrap spring can be tightened at the side of the compression plate and the side of the sensing device when the spindle drive is located at the side of the compression plate. When the spindle drive is located at the side of the clutch cover the spring ends of the wrap spring can preferably be tightened at the side of the clutch cover and the side of the sensing device. In both cases the wrap spring is used as a freewheel that can be controlled, with the control transmitting a torque by the sensing device in the direction of rotation of the spindle shaft. For this purpose the wrap spring can subsequently be switched using Eytelwein's rope friction and is frictionally connected to the spindle shaft by the spring ends of the wrap spring being appropriately impinged. Here, one spring end is supported at the side of the compression plate, thus at a part, which can be axially displaced during the operation process, for example at the compression plate, the ramp ring, the lever element, and/or the disk spring, or a part connected thereto. The other spring end of the wrap spring is supported at the side of the sensing device, thus directly at the sensing device or a part connected thereto.

A similar arrangement and support applies equivalently for the operating lever of a roller clutch.

Accordingly, the sensing device is preferably embodied to sense a wear status of the torque transmitting device when engaging said torque transmitting device depending on a distance from a component of the coupling device, fixed at the housing, preferably a counter pressure plate of the torque transmitting device. The first free running unit can be driven by the sensing device when disengaging the torque transmitting device in order to compensate wear by way of rotating the spindle shaft.

In particular, it is advantageous when the sensing device comprises a finger or pin, which preferably is displaceable in the axial direction and preferably arranged at the compression plate of the torque transmitting device, allowing to impinge an actuator lever of the roller clutch of the first free running unit or a spring end of the wrap spring of the first free running unit.

Overall, the finger or pin may be arranged at the side of the compression plate and sense the deviation of the operating point in reference to the counter pressure plate, or at the counter pressure plate and/or the housing and sense the deviation of the operating point in reference to the compression plate. Due to the fact that the rotation of the ramp ring, arranged between the compression plate and the disk spring, is not possible due to the compression force applied upon the compression plate when the torque transmitting device is engaged by the disk spring, it is possible to temporarily save the angle of rotation required for compensating a displaced operating point in the form of a pre-stressed state of the sensing device and at least partially implement it during the subsequent disengaging process, in which the ramp ring is released in the axial direction, into an angle of rotation of the ramp ring releasing the pre-stressing. In the subsequent operation of closing and opening of the coupling device, i.e. the successive engaging and disengaging, here an operating point, previously not finally corrected, can be continuously compensated.

According to one advantageous exemplary embodiment the sensing device may be formed from a finger or pin, which is arranged at the compression plate in a displaceable fashion against the effect of an energy storage element, impinging an actuator lever of the roller clutch or the spring end of the wrap spring. Here, the actuator lever of the roller clutch and/or the wrap spring remains pre-stressed by the energy storage element when the operating point on the spindle shaft is correct, so that even in a disengaged torque transmitting device and a load-free ramp ring no accidental rotation of the ramp ring occurs by a blockage of the spindle shaft via the first free running unit. In case of a displaced operating point, as soon as the finger or pin contacts a stop fixed at the housing, for example at the counter pressure plate, during the closing process of the torque transmitting device, here the first free running unit, i.e. the roller clutch or the wrap spring, is released in reference to the spindle shaft, with the first running unit being rotated in reference to the spindle shaft by a predetermined extent. During the subsequent opening process of the torque transmitting device, based on the actuator lever impinging the roller clutch or the wrap spring, the friction-fitting connection is reestablished, with the wear compensation occurring and thus also, under a rotation of the spindle shaft, a translational motion of the spindle nut and thus also a rotation of the ramp ring. The energy storage element pre-stressing the finger or pin in the direction of the counter pressure plate can be a helical spring, for example.

In an alternative exemplary embodiment the sensing device may be formed from a flat spring, elastically accepted at the housing and impinging an actuator lever of the roller clutch of the first free running unit or a spring end of the wrap spring of the first free running unit. When the compression plate is displaced in the direction towards the counter pressure plate during the shift of the operating point, here the pre-stressing of the actuator lever of the roller clutch or the wrap spring is compensated by the flat spring preferably received in the housing and the actuator lever of the roller clutch and/or the wrap spring is rotated in reference to the spindle shaft. During the subsequent opening process the spindle shaft jointly rotates with the actuator lever of the roller clutch and/or the wrap spring, while being impinged by the flat spring in order to readjust the ramp ring.

The wear compensation preferably comprises a tracker for tracking the pre-stressing and/or the angular position of the first free running unit arranged on the spindle shaft. Preferably the tracker is embodied in the form of a ramp.

According to a preferred exemplary embodiment the tracker unit can be displaced in a direction perpendicular in reference to the coupling device or in the circumferential direction of the coupling device. Here, it is advantageous for the tracker unit to be fastened at the ramp ring or at the spindle nut of the spindle drive or to be embodied in one piece with the ramp ring or the spindle nut. Preferably the actuator lever of the roller clutch of the first free running unit or the spring end of the wrap spring of the first free running unit engages the ramp of the tracker unit by contacting in a gliding motion.

According to another preferred exemplary embodiment an actuator lever of the roller clutch of the second free running unit or a spring end of the wrap spring of the second free running unit is supported on a compression plate of the torque transmitting device. This allows a particularly reliable prevention against the free running moment of the spindle drive rotating reversely, particularly when the ramp ring is clamped between the lever element and the compression plate and when the above-mentioned finger or pin deflects the actuator lever of the roller clutch of the first free running unit or the spring end of the wrap spring of the first free running unit.

BRIEF DESCRIPTION OF THE DRAWINGS

The present invention is explained in greater detail based on the preferred exemplary embodiments in connection with the corresponding figures. They show.

DETAILED DESCRIPTION OF THE PREFERRED EMBODIMENTS

FIGS. 1 to 8 relate to two preferred exemplary embodiments of a coupling device 1 with a continuous wear compensation device 3. Features not characterized as essential for the invention in the present description shall be considered optional. Accordingly the following description also relates to other exemplary embodiments of the coupling device 1 and/or the continuous wear compensation device 3, which show partial combinations of the features explained in the following. The coupling device 1 is particularly embodied as a friction coupling and provided for the drive train of a motor vehicle.

The coupling device 1 is supported rotational about a central axis and comprises at least one torque transmitting device 2. The torque transmitting device 2 comprises at least one compression plate 6, at least one counter pressure plate, not shown, and at least one coupling disk, not shown, arranged between the compression plate 6 and the counter pressure plate in the axial direction A of the coupling device 1. The counter pressure plate is connected fixed to a housing 5 of the coupling device 1, particularly to a clutch cover, particularly via a screw connection. The compression plate 6 is supported in a torque-proof fashion in the housing 5, particularly in the clutch cover, and can be displaced to a limited extent in the axial direction A of the coupling device 1. In particular the compression plate 6 is fastened in the housing 6 in a torque proof fashion via several flat springs, not shown, and pre-stressed away from the counter pressure plate, i.e. upwards with respect to FIG. 1.

Figure 1:
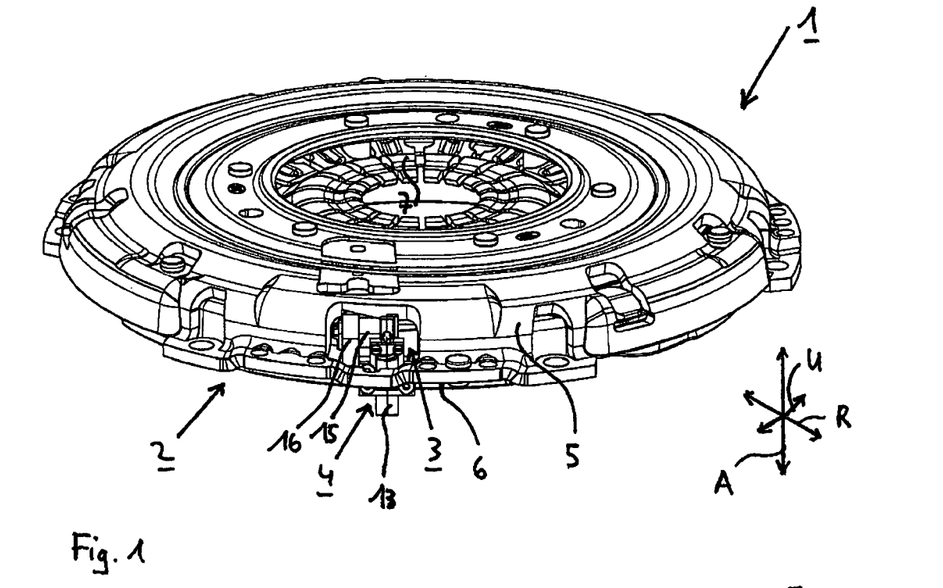
FIG. 1 a first exemplary embodiment of a coupling device with a continuous wear compensation device, FIG. 2 the continuous wear compensation device of FIG. 1 in a side view, FIG. 3 the continuous wear compensation device of FIG. 1 in a cross-sectional view, FIG. 4 a spindle drive of the continuous wear compensation device of FIG. 1, FIG. 5 a second exemplary embodiment of a coupling device with a continuous wear compensation device, FIG. 6 the continuous wear compensation device of FIG. 5 in a side view, FIG. 7 the continuous wear compensation device of FIG. 5 in a cross-sectional view, and FIG. 8 a spindle drive of the continuous wear compensation device of FIG. 5.

Furthermore, the coupling device 1 comprises a lever element 7, which may be embodied as a disk spring for a coupling device 1 engaged in the normal state, and as a lever spring for a coupling device 1 disengaged in the normal state. The lever element 7 is supported at the housing side and can be operated by an actuator. The support at the housing side may for example occur by a support unit, not shown, fastened at the clutch cover, by which the lever element 7 is suspended in a pivotal fashion. For this purpose the support unit comprises for example two wire loops, distanced in the axial direction A of the coupling device 1, between which the lever element 7 extends in the radial direction R of the coupling device 1. The lever element 7 can be operated by the actuator via lever tips, arranged in the radial direction R at the inside of the lever element 7 preferably embodied in an essentially annular fashion.

The lever element 7 comprises a force edge in its radial exterior section. The lever element 7 directly impacts the compression plate 6 via a ramp ring 8, which is to be allocated to the wear compensation device 3 discussed in the following, by the force ring of the lever element 7 contacting the surface of the ramp ring 8 at the side of the lever element, opposite the compression plate 6, and in the engaged state of the coupling device 1 and/or the torque transmitting device 2 applies pressure upon the ramp ring 8. This pressure is transmitted via the surface of the ramp ring 8, facing away from the lever element 7, to the compression plate 6.

In the normally engaged coupling device 1, shown in FIG. 1, the effective force of the lever element 7 embodied as a disk spring exceeds the counter force of the flat springs, while in a normally disengaged coupling device 1 the counter force of the flat springs exceeds the effective force of the lever element 7 embodied as a lever spring. Accordingly, an operation of the disk spring of the normally engaged coupling device 1, shown in FIG. 1, leads to the coupling device 1 being disengaged by way of pivoting the disk spring and/or snapping over, i.e. lifting off the compression plate 6 and removing the compression plate 6 from the counter pressure plate, while an operation of the lever spring in a normally disengaged coupling device 1 leads to the coupling device being engaged by the lever spring being pivoted.

In an engaged torque transmitting device 2 the torque is frictionally transmitted to the coupling disk from the input side of the coupling device 1, for example from a two-weight freewheel via the housing 5 and both the counter pressure plate as well as the compression plate 6, with both of them being connected in a torque-proof fashion to the housing 5, particularly the clutch cover. From the coupling disk, which is frictionally clamped between the counter pressure plate and the compression plate 6, the torque is transmitted to the output side of the coupling device 1, for example to the input shaft of a transmission.

Due to the fact that based on the friction-fitting connection both the friction coating of the coupling disk as well as, to a lesser extent, the friction coatings of the counter pressure plate and the compression plate 6 are subject to wear and tear, the compression plate 6 must constantly be moved closer to the counter pressure plate over the life of the coupling device 1, in order to compensate the reduction in thickness of the friction coatings and the strength of the friction coatings in the axial direction A and to ensure the friction-fitting connection and/or to allow the engagement of the torque transmitting device 2. For this purpose the coupling device 1 is provided with the above-mentioned wear compensation device 3.

In addition to the above-mentioned ramp ring 8, the wear compensation device 3 comprises a spindle drive 9. The entire spindle drive 9 is supported rotational on the sides of the compression plate 6 via at least one fastener 10, with said fastener 10 being connected for example to a side of the compression plate 6 facing away from the coupling disk, particularly screw-connected or welded.

Figure 4:
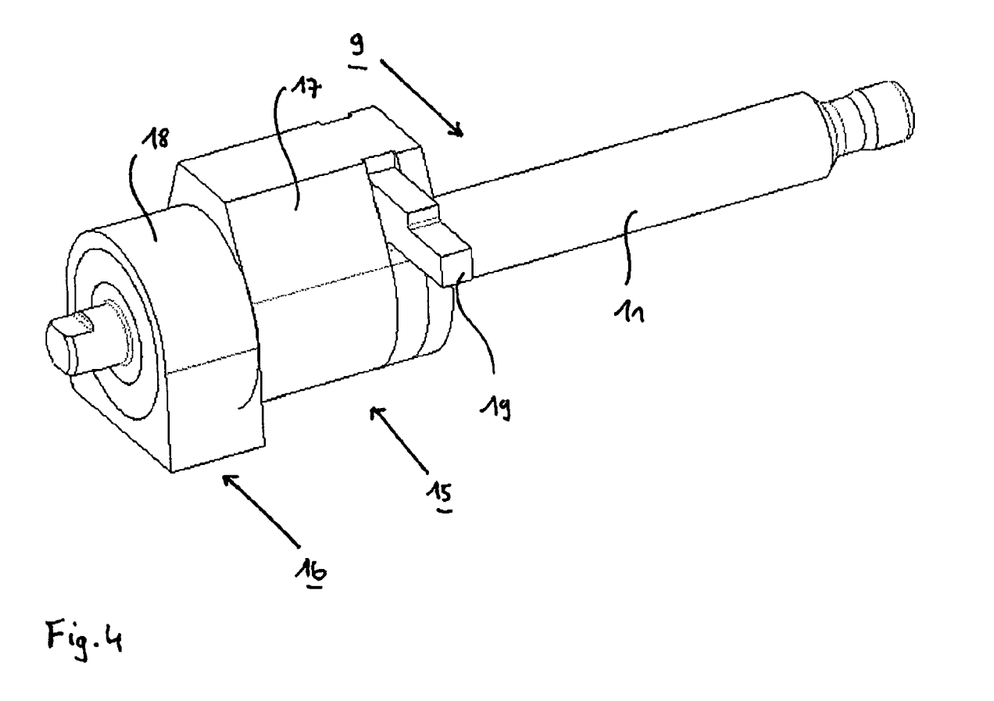

The spindle drive 9 comprises a spindle shaft 11 and a spindle nut 12. The spindle drive 10 is connected via the spindle nut 12 to the ramp ring 8, with the rotary motion of the spindle shaft 11 being converted into a translational motion of the spindle nut 12, and the translational motion of the spindle nut 12 being converted into a rotary motion of the ramp ring 8. The ramps of the ramp ring 8 are arranged mobile in a gliding fashion on counter ramps, which are embodied torque-proof with the compression plate 6 on the side of the compression plate 6 facing away from the coupling disk, preferably recessed in the compression plate 6.

Figure 2:
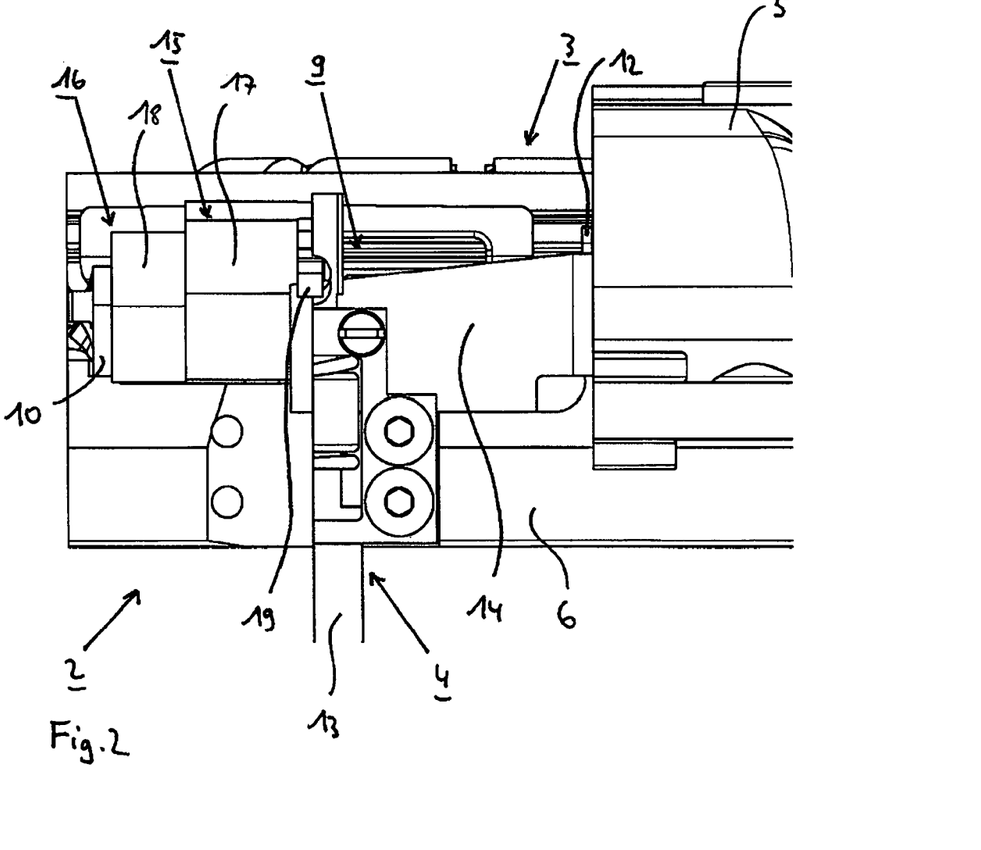
Figure 3:
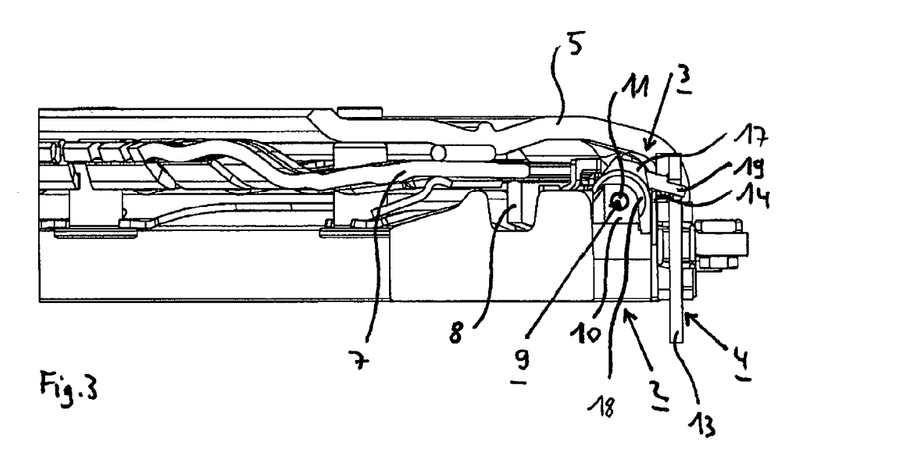

Further, two continuous free running units 15, 16 are arranged on the spindle shaft 11, acting in different directions of rotation. The first free running unit 15 is embodied to rotate the spindle shaft 11 in case of a sensed wear state of the torque transmitting device 2, while the second free running unit 16 being embodied to prevent a reverse rotation of the spindle shaft 11, i.e. to prevent any rotation of the spindle shaft 11 opposite the direction of rotation of the sensed wear state. Preferably the two free running units 15, 16 are arranged in the circumferential direction U of the coupling device 1 and/or directly side-by-side on the same spindle shaft 11 in the tangential direction of the coupling device 1. However it is also possible that the two free running units 15, 16 are arranged on the same spindle shaft 11, distanced from each other. It is also possible for the two free running units 15, 16 to be arranged on different shafts, for example connected to each other in a torque-proof fashion.

In the first exemplary embodiment of the coupling device 1 the first free running unit 15 comprises a roller clutch 17. Preferably the second free running unit 16 also comprises a roller clutch 18. This way the two free running units 15, 16 preferably comprise roller clutches 17, 18 acting in different directions of rotation. The roller clutch 17 of the first free running unit 15 is arranged on the spindle shaft 11 and embodied to engage the spindle shaft 11 in a force-fitting fashion, preferably a friction-fitting fashion, depending on the position of the operating point of the torque transmitting device 2, changed due to a wear state, in order to compensate said wear by rotating the ramp ring 8 in reference to the complementary counter ramps. The roller clutch 18 of the second free running unit 16 is arranged on the spindle shaft 11 and embodied to engage in a force-fitting fashion, particularly in a friction-fitting fashion, in order to prevent any reverse rotation of the spindle shaft 11. Preferably an actuator lever, not shown, of the roller clutch 18 of the second free running unit 16 is supported on the compression plate 6 of the torque transmitting device 2.

In addition to the wear compensation device 3, the coupling device 1 further comprises a sensing device 4. The sensing device 4 is being embodied to sense a wear state of the torque transmitting device 2 when the torque transmitting device 2 is engaged, depending on a distance from a part of the coupling device 1 fixed at the housing. Preferably the sensing occurs depending on a distance from the counter pressure plate of the torque transmitting device 2. Preferably the first free running unit 15 can be driven by the sensing device 4 when disengaging the torque transmitting device 2 in order to compensate wear, with the drive of the free running unit 15 causing a rotation of the spindle shaft 11, and thus also a translational motion of the spindle nut 12 and a rotation of the ramp ring 8.

Concretely, the sensing device 4 exhibits in the exemplary embodiment shown a finger 13, preferably arranged at the compression plate 6 of the torque transmitting device 2. The finger 13 can be displaced in the axial direction A of the coupling device 1 and for this purpose for example supported in a gliding fashion mobile in a fastener at the side of the compression plate. By the finger 13, which can be displaced in the axial direction A, an actuator lever 19 of the roller clutch 17 of the first free running unit 15 can be impinged in order to trigger the wear compensation device 3, in case of a sensed coupling wear, i.e. allowing for the sensed wear of the coupling to be compensated with regards to the path.

In order to prevent that in case of wear of the coupling here wear sensing occurs during each engagement of the torque transmitting device 2 and consequently during each disengagement of the torque transmitting device 2 a wear adjustment occurs, the wear compensation device 3 comprises a tracking unit 14. The tracking unit 14 is preferably embodied like a ramp and for example connected fixed to the spindle nut 12, mobile in a translational fashion, or embodied in one piece therewith. The tracking unit 14 is arranged and embodied to ensure the tracking of the pre-stressing and/or the angular position of the first free running unit 15 arranged on the spindle shaft 11.

For this purpose, in the first exemplary embodiment the actuator lever 19 of the roller clutch 17 of the first free running unit 15 contacts the ramp-shaped tracking unit 14 in a gliding fashion. When wear has been compensated the ramp-shaped tracking unit 14 causes for the actuator lever 19 to lift off the roller clutch 17 of the first free running unit 15, increasing the trigger threshold for a subsequent sensing of wear, and thus simultaneously for a subsequent wear compensation.

From the arrangement of the wear compensation device 3 in the coupling device 1 the following functionality follows:

When the operating point is not displaced and the coupling device 1 and/or the torque transmitting device 2 are closed and/or engaged, the finger 13 of the sensing device 4 at best contacts the counter pressure plate, however it is not displaced in the axial direction A and/or only displaced to such an extent that its engaged section, engaging the actuator lever 19 of the roller clutch 17 of the first free running unit 15, for example a recess in the finger 13, is not displaced via the ramp-shaped contact area of the tracking unit 14. By the axial height of the recess at the finger side, in which the actuator lever 19 is received, i.e. by the play between the stops of the recess, the embodiment of the frictional engagement of the roller clutch 17 of the first free running unit 15 can be controlled and/or adjusted in reference to the spindle shaft 11.

When opening and/or disengaging the torque transmitting device 2 the compression plate 6 is displaced in the axial direction A away from the counter pressure plate, and the finger 13 lifts off the counter pressure plate. As long as no wear has been sensed no rotation of the spindle shaft 11 occurs by the roller clutch 17 of the first free running unit 15, because the actuator lever 19 rests on the ramp-shaped contact area of the tracking unit 14.

When the thickness of the friction coatings reduces due to wear of the coupling the compression plate 6 displaces and thus also the operating point of the coupling device 1 in the direction towards the counter pressure plate so that the finger 13 already rests on the counter pressure plate during the engaging process of the torque transmitting device 2 and is displaced in the axial direction A when the engagement process continues. This way the actuator lever 19 of the roller clutch 17 of the first free running unit 15 is lifted off the ramp-shaped contact area of the tracking unit 14 so that during the subsequent engagement of the torque transmitting device 2 the wear compensation occurs by the first free running unit 15 by way of the spindle shaft 11 being driven in a rotary fashion by the roller clutch 17 of the first free running unit 15, causing the spindle nut 12 to be displaced in a translational fashion, and here the ramp ring 8 being rotated such that the ramps of the ramp ring 8 glide upwards along the counter ramps recessed in the compression plate 6 in order to compensate the sensed wear of the coupling with regards to its path.

The second free running unit 16, in the first exemplary embodiment the roller clutch 18 of the second free running unit 16, prevents any unintended reverse rotation of the spindle shaft 11 so that the wear compensation device 3 is no longer dependent on the pre-stressing and the friction of the ramp ring 8 in the operating point of the coupling device 1.

The second exemplary embodiment of the coupling device 1 shown in FIGS. 5 to 8 differs from the first exemplary embodiment of the coupling device 1 shown in FIGS. 1 to 4 such that the second free running unit 16 comprises a wrap spring 20 instead of the roller clutch 18. A spring end 21 of the wrap spring 20 of the second free running unit 16 is supported on the compression plate 6 of the torque transmitting device 2 in order to prevent any unintended reverse rotation of the spindle shaft 11 opposite the direction of wear compensation.

Figure 5:
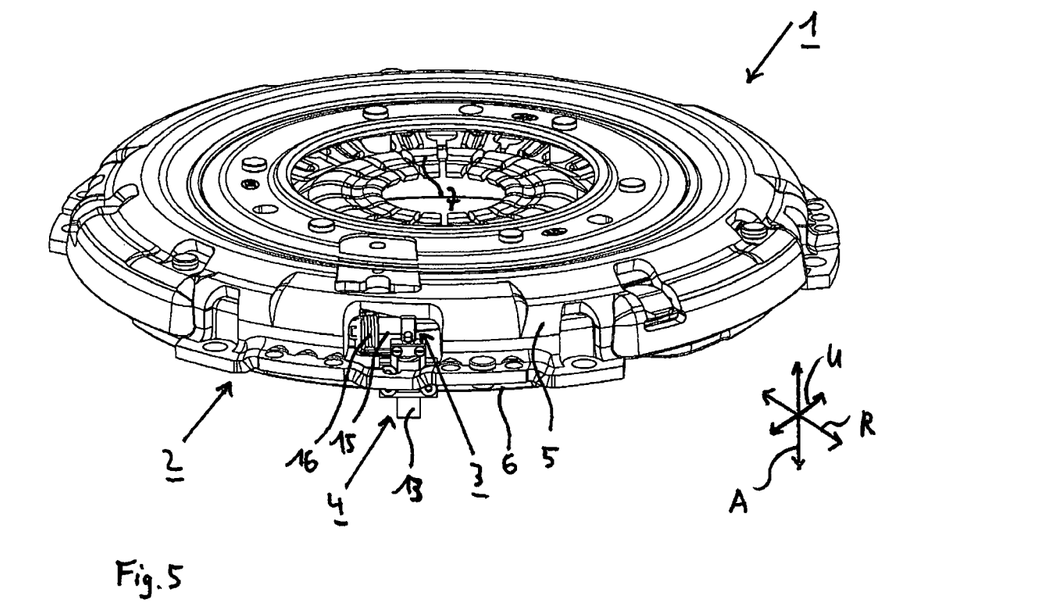
Figure 6:
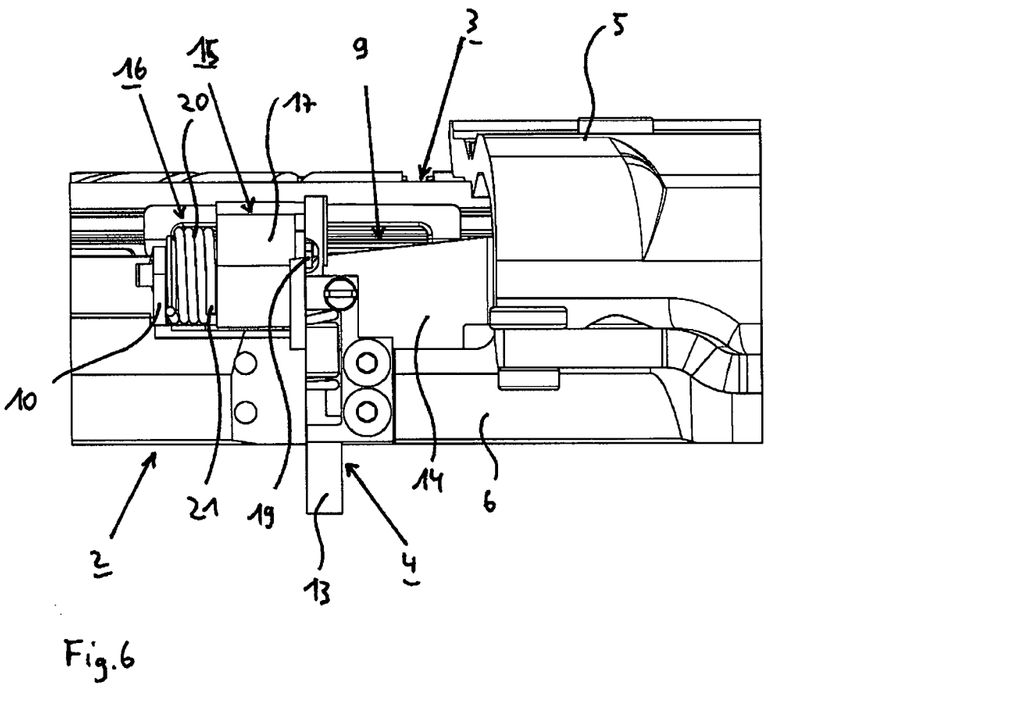
Figure 7:
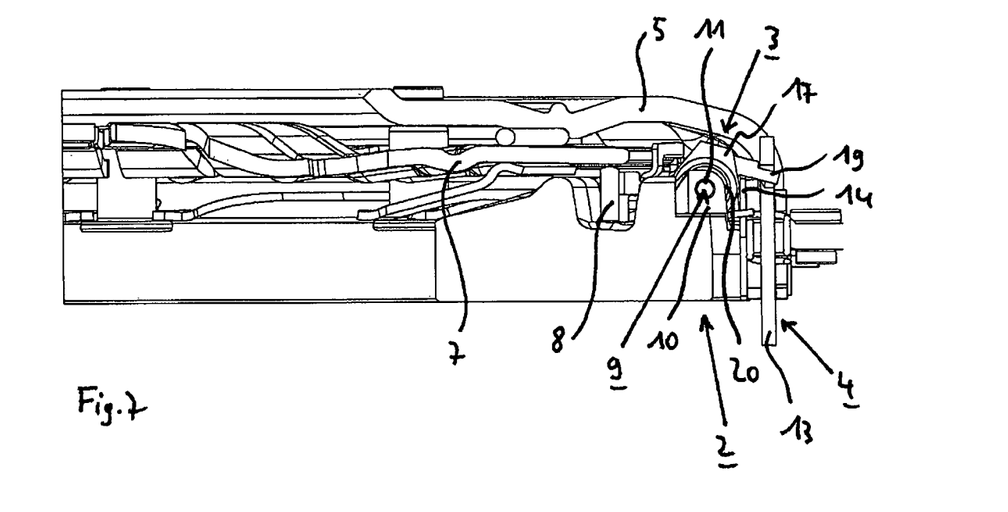
Figure 8:
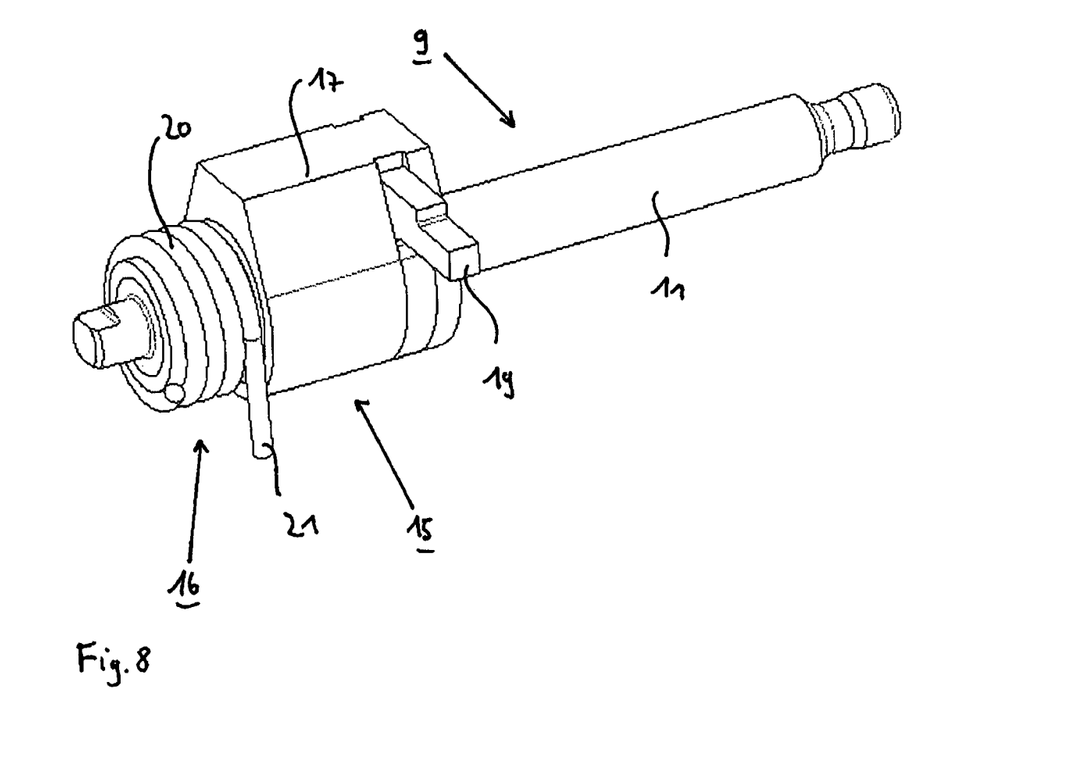

For the rest the design and the function of the coupling device 1 of the second exemplary embodiment is equivalent to the design and the function of the coupling device 1 of the first exemplary embodiment.

Although it is not shown, it is also possible that the first free running unit 15 comprises a wrap spring, while the second free running unit 16 comprises a roller clutch 18. Additionally it is possible that both free running units 15, 16 include wrap springs 20 acting in different directions of rotation.

When the first free running unit 15 comprises a wrap spring, said wrap spring wraps around the spindle shaft 11 under internal pre-stressing and is embodied, depending on the position of an operating point of the coupling device 1, changing in the wear state, and/or the torque transmitting device 2, to contact the spindle shaft 11 for the purpose of wear compensation by rotating the ramp rings 8 in reference to the complementary counter ramps, recessed in the compression plate 6, in a force-fitting fashion, preferably a friction-fitting fashion. In this case one spring end of the wrap spring of the first free running unit 15 can be impinged by the finger 13 of the sensing device 4, which can be displaced in the axial direction A, in order to sense wear.

When the second free running unit 16, as in the second exemplary embodiment of the coupling device 1, shows a wrap spring 20, said wrap spring 20 wraps around the spindle shaft 11 under internal pre-stressing and is embodied to engage the spindle shaft 11 in a force-fitting fashion, preferably a friction-fitting fashion in order to prevent the reverse rotation of the spindle shaft 11.

The above-stated exemplary embodiments refer to a coupling device 1 with at least one torque transmitting device 2, which can be engaged and/or disengaged by a lever element 7 in the axial direction A and is friction-fitting in the engaged state and at least one wear compensation device 3, which comprises at least one rotational ramp ring 8, which at least temporarily can be clamped by the lever element 7, and at least one spindle drive 9 with a spindle shaft 11, rotationally supported and acting upon the ramp ring 8, with the wear compensation device 3 comprising at least two continuous free running units 15, 16 acting in different directions of rotation, with a first free running unit 15 being embodied to rotate the spindle shaft 11 when a wear state of the torque transmitting device 2 has been sensed, and with a second free running unit 16 being embodied to prevent any reverse rotation of the spindle shaft 11.

LIST OF REFERENCE CHARACTERS

1 Coupling device
2 Torque transmitting device
3 Wear compensation device
4 Sensing device
5 Housing
6 Compression plate
7 Lever element
8 Ramp ring
9 Spindle drive
10 Fastener
11 Spindle shaft
12 Spindle nut
13 Finger
14 Tracker unit
15 First free running unit
16 Second free running unit 17 Roller clutch
18 Roller clutch
19 Actuator lever
20 Wrap spring
21 Spring end
A Axial direction
R Radial direction
U Circumferential direction

The invention claimed is:

1. A coupling device comprising
at least one torque transmitting device, which is engagable or disengagable in an axial direction (A) by a lever element and is frictionally engaged in the engaged state,
at least one wear compensation device, which has at least one rotatable ramp ring that is clamped by the lever element at least temporarily and which has at least one rotationally mounted spindle drive with a spindle shaft, and said spindle drive acting on the ramp ring, and at least first and second continuously variable free running units arranged on the spindle shaft, which act in different rotational directions, with the first free running unit being designed to rotate the spindle shaft when a wear state of the torque transmitting device is sensed and the second free running unit being designed to prevent a reverse rotation of the spindle shaft.

2. A coupling device according to claim 1, wherein the first free running unit or the second free running unit comprise a roller clutch.

3. A coupling device according to claim 1, wherein the second free running unit or the first free running unit comprise a wrap spring.

4. A coupling device according to claim 1, wherein both of the free running units comprise roller clutches acting in different directions of rotation or wrap springs acting in different directions of rotation.

5. A coupling device according to claim 4, wherein the roller clutch is arranged on the spindle shaft and embodied, depending on a position of an operating point of the torque transmitting device changing in a wear state, to engage the spindle shaft in a force-fitting fashion for at least one of wear compensation by rotating the ramp ring in reference to complementary counter ramps or preventing the reverse rotation of the spindle shaft.

6. A coupling device according to claim 3, wherein the wrap spring wraps around the spindle shaft under internal pre-stressing and is embodied, depending on a position of the torque transmitting device changing in the wear state, to engage the spindle shaft in a force-fitting fashion for at least one of wear compensation by rotating the ramp ring in reference to the complementary counter ramps or to prevent the reverse rotation of the spindle shaft.

7. A coupling device according to claim 1, further comprising a sensing device embodied to sense a wear state of the torque transmitting device when engaging the torque transmitting device depending on a distance from a part of the coupling device, fixed at the housing, and the first free running unit is driven by the sensing device when disengaging the torque transmitting device for wear compensation by rotating the spindle shaft.

8. A coupling device according to claim 7, wherein the sensing device comprises a finger on the torque transmitting device that is displaceable in the axial direction (A), by which an actuator lever of the roller clutch of the first free running unit or a spring end of a wrap spring of the first free running unit can be impinged.

9. A coupling device according to claim 1, wherein the wear compensating device comprises a tracking unit that tracks at least one of a pre-stressing or an angular position of the first free running unit arranged on the spindle shaft.

10. A coupling device according to of claim 1, wherein an actuator lever of a roller clutch of the second free running unit or a spring end of a wrap spring of the second free running unit is supported on a compression plate of the torque transmitting device.

\* \* \* \* \*